United States Patent
Luitje et al.

(10) Patent No.: US 6,925,365 B2
(45) Date of Patent: Aug. 2, 2005

(54) FLASH LOADER FOR VEHICLE ELECTRONIC CONTROL UNITS

(75) Inventors: William V Luitje, Ann Arbor, MI (US); Thomas H Pruett, Westland, MI (US); Andrij A Birko, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 113 days.

(21) Appl. No.: 10/634,527

(22) Filed: Aug. 5, 2003

(65) Prior Publication Data

US 2004/0078119 A1 Apr. 22, 2004

Related U.S. Application Data

(60) Provisional application No. 60/401,271, filed on Aug. 5, 2002.

(51) Int. Cl.[7] .................................................. G06F 17/00
(52) U.S. Cl. ............................ 701/1; 701/29; 701/33; 711/103; 713/1
(58) Field of Search ............................. 701/29, 33, 1, 701/35; 713/1, 2, 200; 711/103

(56) References Cited

U.S. PATENT DOCUMENTS

| | | | |
|---|---|---|---|
| 5,278,759 A | 1/1994 | Berra et al. ................ 701/1 |
| 5,555,498 A | 9/1996 | Berra et al. ................ 701/33 |
| 5,826,205 A | * 10/1998 | Koelle et al. .............. 701/29 |
| 5,835,760 A | 11/1998 | Harmer ....................... 713/2 |
| 5,949,997 A | * 9/1999 | Smith ......................... 713/2 |
| 6,009,496 A | * 12/1999 | Tsai .......................... 711/103 |
| 6,035,346 A | 3/2000 | Chieng et al. ............. 710/10 |
| 6,052,778 A | 4/2000 | Hagy et al. ................. 713/2 |
| 6,122,733 A | 9/2000 | Christeson et al. ......... 713/2 |
| 6,128,694 A | * 10/2000 | Decker et al. ............ 711/103 |
| 6,185,678 B1 | 2/2001 | Arbaugh et al. ............ 713/2 |
| 6,236,917 B1 | 5/2001 | Liebl et al. ................ 701/29 |
| 6,275,931 B1 | 8/2001 | Narayanaswamy et al. .... 713/2 |
| 6,282,640 B1 | 8/2001 | Klein ......................... 713/1 |
| 6,282,647 B1 | 8/2001 | Leung et al. .............. 713/100 |
| 6,289,449 B1 | 9/2001 | Aguilar et al. ............. 713/2 |
| 6,301,656 B1 | 10/2001 | Streett et al. .............. 713/2 |
| 6,324,644 B1 | 11/2001 | Rakavy et al. ............. 713/1 |
| 6,523,083 B1 | * 2/2003 | Lin et al. .................. 711/103 |
| 2003/0065935 A1 | * 4/2003 | Neufeld ..................... 713/200 |

* cited by examiner

*Primary Examiner*—Tan Q. Nguyen
(74) *Attorney, Agent, or Firm*—Rhonda L. McCoy-Pfau

(57) ABSTRACT

A flashloader having a standard module for receiving programming instructions and an application program via a communications port of a vehicle controller, where the flashloader further provides an MCU module for writing the received application program to reprogrammable memory within the vehicle controller, and an ECU module for determining whether a valid application program has been stored in the reprogrammable memory. Upon detection of a valid application program a microprocessor of the vehicle controller executes instructions from the reprogrammable memory and upon detection of an invalid application program the microprocessor continues to execute instructions from the bootloader.

2 Claims, 2 Drawing Sheets

FLASH LOADER FOR VEHICLE ELECTRONIC CONTROL UNITS

CROSS-REFERENCE TO RELATED APPLICATION

This application claims the benefit of Provisional Patent Application Ser. No. 60/401,271, filed Aug. 5, 2002.

FIELD OF THE INVENTION

This invention relates generally to software for vehicle control units, and more specifically, to an embedded controller flashloader for reprogramming the vehicle electronic control unit while it remains installed in a vehicle.

BACKGROUND

Modern vehicles often incorporate a number of electronic control units which execute application software and communicate with each other via a bus network. Examples of such vehicle control units, or controllers, include body controllers, passive restraint controllers, wireless communication controllers, and so forth. Periodically a need arises to reprogram or update the application software in one of these controllers.

Depending on the architecture of a controller's reprogramming function, reprogramming the vehicle controller may be a time consuming and risky task. For example, the reprogramming architecture of some vehicle control units dictates that the unit be removed from the vehicle. Removing the control unit from the vehicle for reprogramming results in an undesirable expenditure of time, and also increases the risk that the vehicle or the controller may be damaged in the process by being scratched or dented, by bending the electrical contacts making the electrical connection between the control unit to the vehicle wiring harness, or by electrostatic discharge into the electrical contacts. It is therefore desirable to provide a method and architecture for reprogramming a vehicle electronic unit while the unit remains installed in the vehicle.

Another issue that may befall the reprogramming architecture of a vehicle controller is a lack of structure in the controller's flashloader firmware which controls communication between the vehicle controller and a reprogramming tool, and also controls the reprogramming operation within the vehicle controller. A lack of structure, or poor structure, in the firmware causes the maintenance effort and verification time to increase each time a function is added to the firmware and the function must be ported to several vehicle controllers. Also, the structure of the firmware may dictate that a single party has knowledge of all aspects of the vehicle controller, including the microprocessor register map, the electrical specifications and schematic of the controller, and also the communication protocol with the reprogramming tool for the controller. With such a structure, the single party may be overburdened with technical concerns and unable to seek programming assistance without expending time training an assisting party on the constituent aspects of the controller. It is therefore desirable to provide a flashloader firmware architecture which facilitates portability and the division of programming effort and expertise among several contributors.

SUMMARY OF THE INVENTION

It is therefore one aspect of this invention to provide a flashloader which facilitates reprogramming of a vehicle controller while the controller remains installed in a vehicle.

It is therefore another aspect of this invention to provide a flashloader architecture which facilitates portability and a division of programming effort among several contributing parties.

In accordance with these aspects of the invention, a flashloader is provided having a standard module for receiving programming instructions and an application program via a communications port of the vehicle controller. The flashloader further provides an MCU module for writing the received application program to reprogrammable memory within the vehicle controller, and an ECU module for determining whether a valid application program has been stored in the reprogrammable memory. Upon detection of a valid application program a microprocessor of the vehicle controller executes instructions from the reprogrammable memory and upon detection of an invalid application program the microprocessor continues to execute instructions from the flashloader.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION

Figure 1:
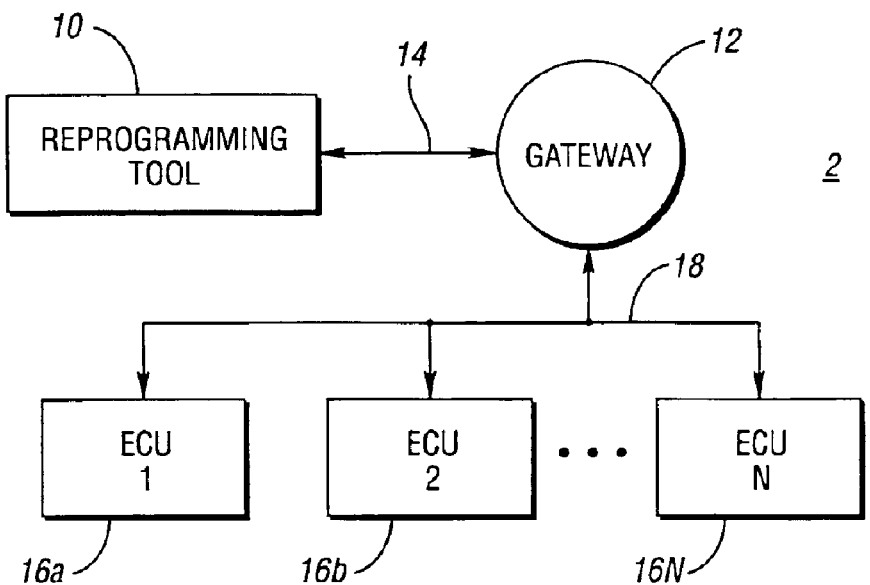
FIG. 1 depicts an ECU network.

Turning to FIG. 1, a vehicle network 2 is shown. A programming tool 10 connects to a gateway module 12 and communicates therewith via a service communication link 14. The gateway 12 bidirectionally translates electrical levels and data protocols between the bus 18 and the service communication link 14. In an alternative embodiment, the programming tool 10 may be compatible with the bus 18 and communicate directly therewith, obviating the need for a gateway 12. The bus 18 provides communication between a plurality of electronic control units, or ECUs, 16a–16N, and the gateway 12.

Periodically, a need arises to reprogram the application software in one of the ECUs 16a–16N. For the reprogramming process, the programming tool 10 contains a replacement copy of the application software and communicates it to the gateway 12 over the service communication link 14. The gateway 12 then recommunicates the application software over the bus 18 to the ECU being reprogrammed. To facilitate programming, the ECU contains a flashloader firmware which receives the application software from the network bus 18 and programs the software into memory, such as flash memory, within the ECU. The flashloader firmware is executed by a microprocessor unit (MCU) within the ECU. The MCU is also in communication with the memory for reading therefrom and writing thereto.

Figure 2:
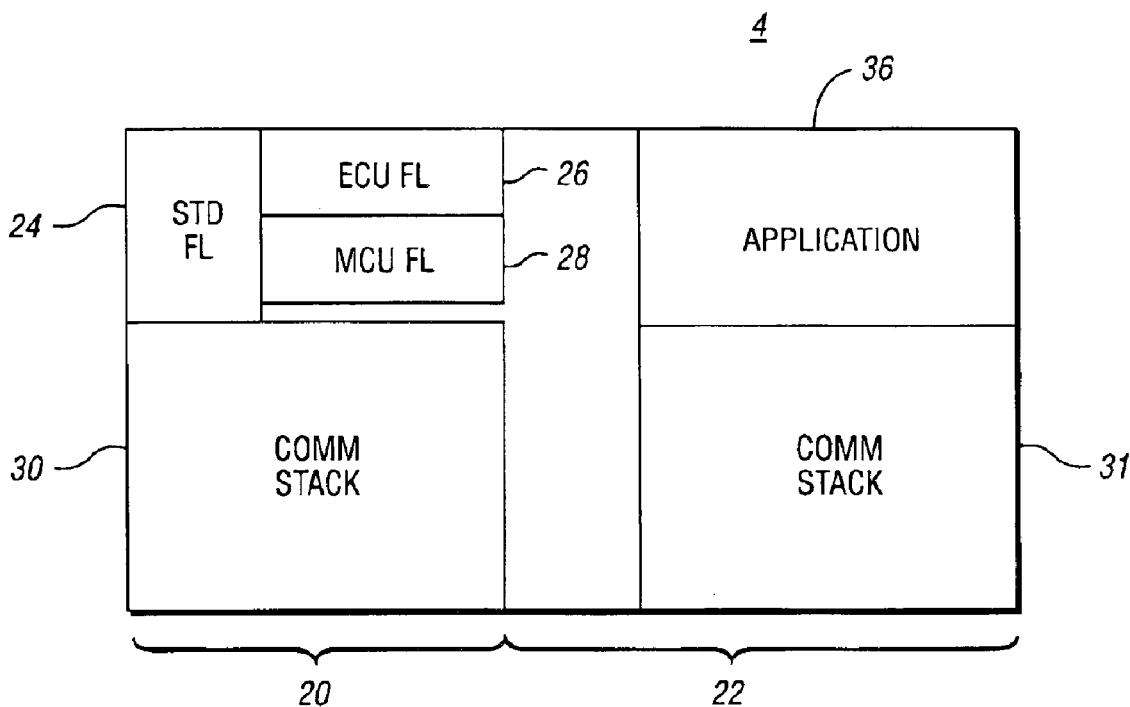
FIG. 2 depicts a memory architecture of a flashloader firmware.

FIG. 2 shows an example memory architecture of flashloader firmware residing within the memory 4 of an ECU 16N. The physical memory is divided into two sections, namely a protected memory 20 and reprogrammable memory 22. The reprogrammable memory 22 stores the application software 36 which includes a communication stack 30.

The protected memory 20 contains the flashloader firmware and is configured as a ROM such that it may not be accidentally erased. The architecture of the flashloader firmware provides for three software modules which may be written and maintained by independent parties. First, a standard module 24 is provided for communicating with the programming tool 10 via a common network communications stack 30 for providing an interface to the bus 18. Second, an ECU module 26 is provided for determining whether valid application software 36 has been stored in the reprogrammable memory 22. Third, an MCU module 28 is provided for writing the application software 36 to reprogrammable memory 22.

Figure 3:
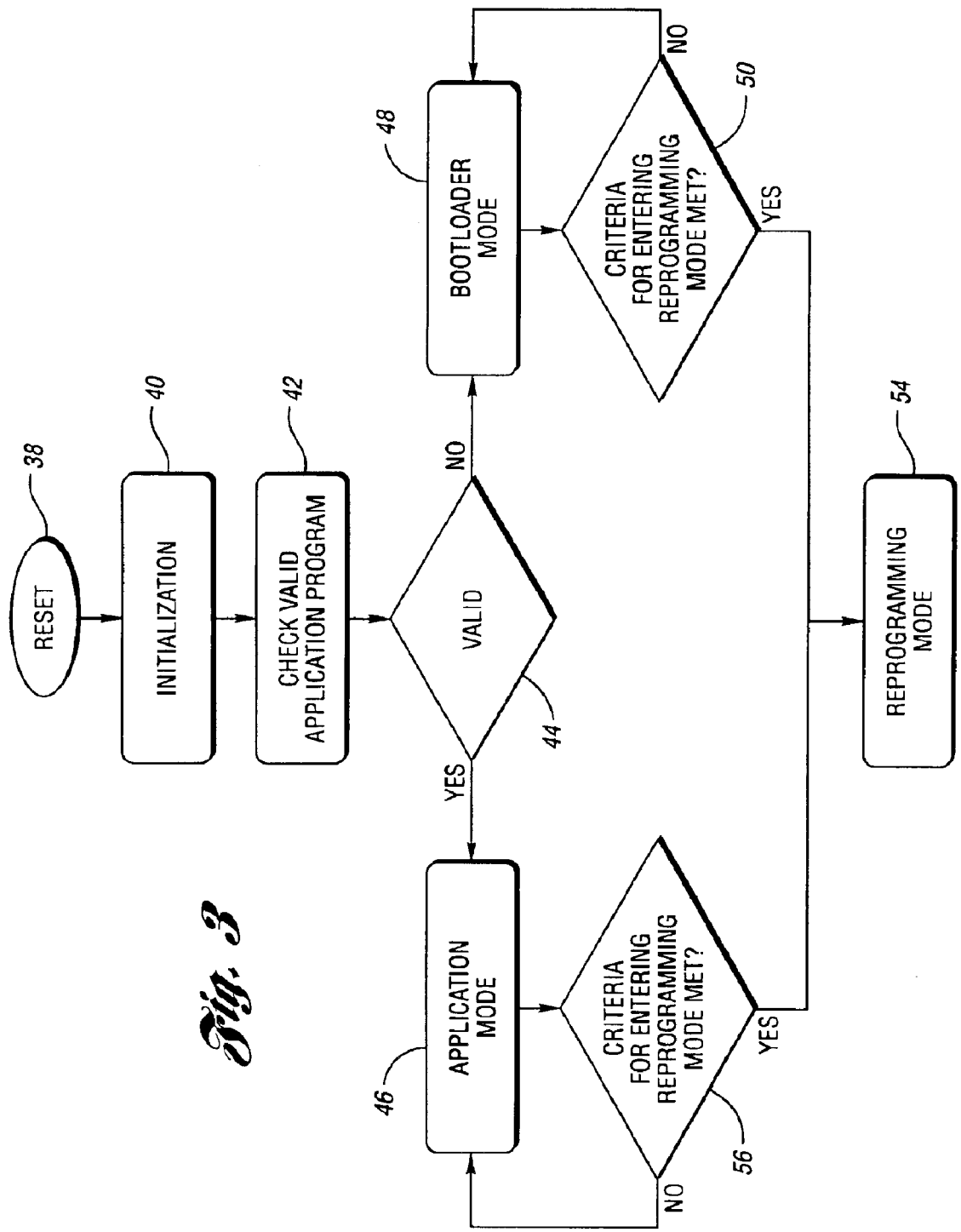
FIG. 3 depicts a flow chart of the flashloader mode selection process.

The operational method of the flashloader firmware is further described in accordance with FIG. 3. Execution of the method begins at entry block 38 when the MCU comes out of reset. The method then enters initialization block 40, where each software module initializes its respective peripherals and variables. For example, the standard module 24 initializes the communications stack 30; the ECU module 26 initializes peripherals external of the MCU such as power I/O devices; and the MCU module 28 initializes the ports and registers internal to the MCU.

Once the initialization step is complete, the method proceeds to block 42 where the ECU module 26 determines whether valid application software 36 is stored in the reprogrammable memory 22. The result of the determination in block 42 is evaluated in decision block 44. If the application software is determined to be valid, the method proceeds to block 46 and executes the application 36. Also at block 46, the application communication stack 31 assumes communication with the bus 18 after it has been relinquished by the flashloader communication stack 30. Returning to block 44, if the application software is determined to be invalid, the method proceeds to block 48 and enters a bootloader mode.

In the bootloader mode, the standard module 24 monitors bus 18 communications for commands from the programming tool 10 to begin the reprogramming process and, if the commands do not arrive within a predetermined amount of time, turns off the ECU or places it in a low power mode. While in the bootloader mode at block 48, the method repeatedly enters decision block 50 and determines whether the standard module 24 has received the requisite security and programming commands for starting the reprogramming process. If the requisite commands have not yet been received, the method returns to block 48. If, however, the requisite commands have been received then the method enters the reprogramming mode at block 54.

The reprogramming mode may also be entered from the application mode at block 46. From block 46, the method enters decision block 56 and determines whether criteria have been met for entering the reprogramming mode 54. Examples of such criteria include receiving a request from the reprogramming tool 10 to enter the reprogramming mode together with the reprogramming tool passing a security handshake with the method.

Once the flashloader method is in reprogramming mode, the programming tool 10 reads version information of the application software that is in the ECU 16N to be reprogrammed. The programming tool 10 then determines whether the replacement application software stored within the programming tool 10 supercedes the application software 36 stored in the reprogrammable memory 22. If the replacement application software properly supercedes the existing software, then the replacement application software is sent to the ECU 16N via the service communication link 14, gateway 12, and bus 18. The standard module 24 within the ECU 16N receives the replacement software through the communications stack 30, 32, 34. Once the replacement software, or a packet thereof, is received by the standard module 24, the MCU module 28 writes the received software to the programmable memory 22. Once the MCU module 28 has written the entire replacement software to memory 22, the MCU module asserts a reset, thereby reinitializing the reprogrammed ECU 16N.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In a vehicle controller having a microprocessor connected to a reprogrammable memory for storing an application program and to a communications port for communicating with a reprogramming device, a flashloader firmware comprising:

a standard module for receiving programming instructions and the application program via the communications port;

an MCU module for writing the received application program to the reprogrammable memory; and an ECU module for determining whether a valid application program has been stored in the reprogrammable memory and further for placing the vehicle controller in one of a low power state and a power-down state after a predetermined amount of time;

wherein upon detection of a valid application program the microprocessor executes instructions from the reprogrammable memory and upon detection of an invalid application program the microprocessor continues to execute instructions from the flashloader.

2. The vehicle controller flashloader of claim 1 further comprising the ECU module being operative to periodically attempt to place the vehicle controller in one of a the low power state and the power-down state when the software module expects programming instructions to arrive via the communications port and the programming instructions have been received after the predetermined amount of time.

* * * * *